V. LANCIA.
CHANGE SPEED GEARING FOR MOTOR CARS.
APPLICATION FILED MAR. 11, 1911.

1,056,804.

Patented Mar. 25, 1913.

2 SHEETS—SHEET 1.

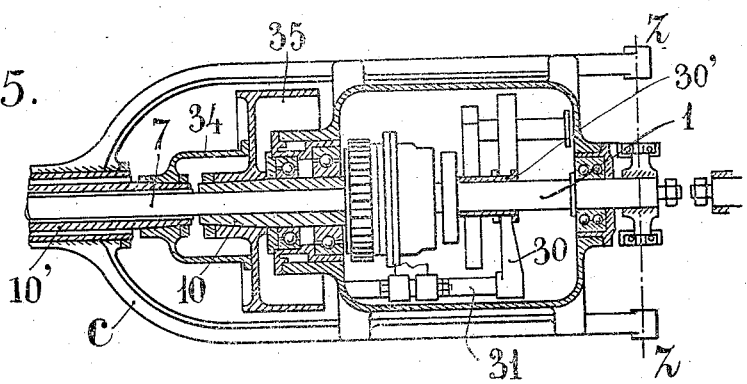
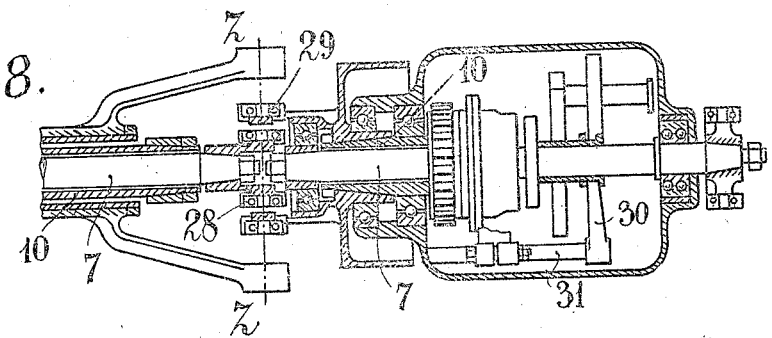
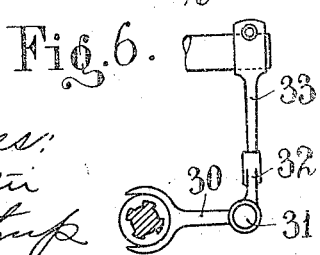

UNITED STATES PATENT OFFICE.

VINCENZO LANCIA, OF TURIN, ITALY.

CHANGE-SPEED GEARING FOR MOTOR-CARS.

1,056,804.     Specification of Letters Patent.     Patented Mar. 25, 1913.

Application filed March 11, 1911. Serial No. 613,755.

*To all whom it may concern:*

Be it known that I, VINCENZO LANCIA, a subject of the King of Italy, residing at Turin, Italy, have invented certain new and useful Improvements in Change-Speed Gearing for Motor-Cars, of which the following is a specification.

This invention relates to a system of change speed gearing by means of which it is possible to have two or more live axle or direct engagement speeds, the transmission being obtained by means of a single toothed wheel adjustable on the driving shaft and capable of giving other reduced speeds, as well as the reverse, by means of countershafts.

Figure 1:
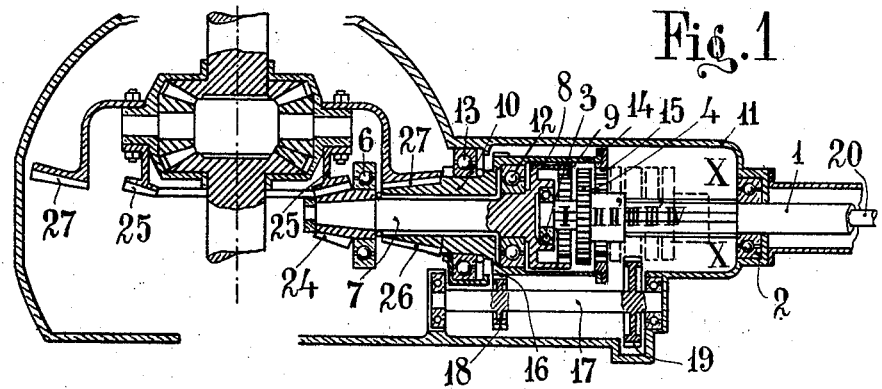
Figure 2:
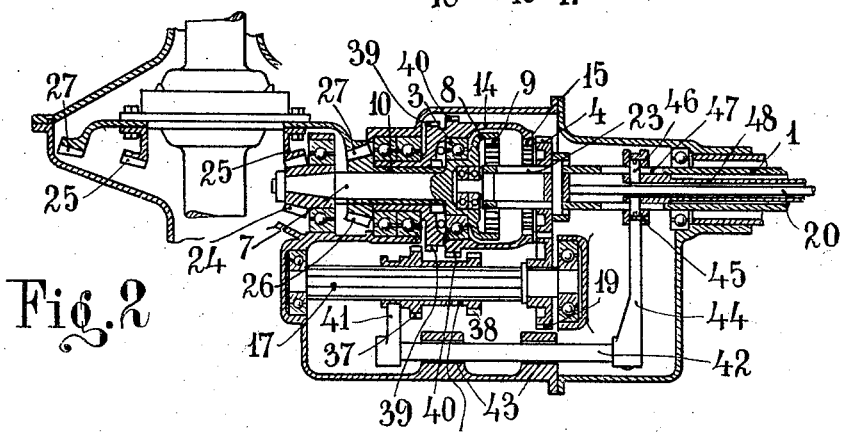
Figure 3:
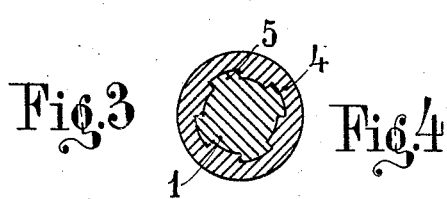
Figure 4:
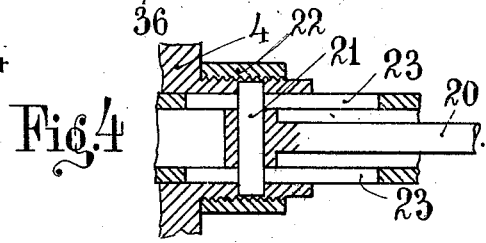

The accompanying drawings show several constructions according to this invention, Figure 1 being a plan and section through the axis of the driving shaft, of a change speed gearing with three speeds, Fig. 2 shows the same type modified, so as to obtain four speeds, and Fig. 3 is a section on line X—X of Fig. 1, Fig. 4 shows on an enlarged scale a detail of the mechanism for shifting the wheel transmitting the movement, Fig. 5 shows an alternative method of fitting the device. Figs. 6 and 7 are respectively front and side elevations of the shifting mechanism of the gearing, and Fig. 8 shows a third method of fitting the device to the car.

As will be seen in Fig. 1, the driving shaft 1 is mounted on bearings 2 and 3, and carries a toothed wheel 4 longitudinally adjustable on it, but keyed to the shaft itself by means of projections 5 (Fig. 3). In line with the shaft 1, is mounted by means of bearings 12 and 6 a shaft 7 which carries a bevel wheel which engages with another bevel wheel on the casing of the differential, while the other end of the shaft is provided with a cylindrical cap 8 with inner teeth 9. Concentrically with the shaft 7, and so as to rotate on the latter, is mounted a sleeve 10 resting also on bearings 12, 13 secured to the change speed gearing box. The said sleeve 10, intended to transmit the movement direct to the rear shaft, is provided at its front end with a cylindrical drum surrounding the cap 8 and provided with inner teeth 15 identical with the teeth 9. If the drum 14 is provided with an outer toothed wheel 16, it will be possible to obtain, by means of a counter-shaft 17 carrying the wheels 18 and 19, a reduced speed, and in the same way, with a double toothed wheel, the reversing will be obtained.

According to this invention, the toothed wheel 19 of the countershaft 17, or the corresponding wheels of any other countershafts that may be used, must have their pitch circle tangential to the cylinder on which are arranged the pitch circles of the toothed wheels 9 and 15. In that way, the longitudinally adjustable pinion 4 keyed to the driving shaft 1 can be brought into engagement with the inner toothed wheels 9 and 15, as well as with the wheel or wheels 19, and thus two speeds in direct engagement and the reduced speed can be obtained by means of a single pinion 4.

If the pinion 4 is brought into the position I on the shaft 1, it will engage with the toothed wheel 9 of the cap 8, and the rotation of the shaft 1 will be transmitted direct to the shaft 7, and by the bevel pinion 24, to the rim 25 secured to the differential.

If the pinion 4 is in the position shown in Fig. 1, the rotation of the shaft 1 is not transmitted to the rear axle, while if the pinion 4 is in the position II, it will engage with the toothed wheel 15, and the driving shaft is then connected by means of the cylinder 14 to the sleeve 10, the pinion 26 of which engages with the rim 27 secured to the differential.

If the pinion 4 is brought into the position II′, there will be no transmission. In the position III, the pinion 4 is in engagement with the wheel 19 mounted on the shaft 17 which, by means of the toothed gears 16, 18, transmits to the drum 14 a reduced speed. The position III′ of the pinion 4 does not give any transmission, and the position IV can be used for reversing by engagement with the pinion of a countershaft (not shown in the drawing.)

In order to bring about the shifting of the pinion 4 on the driving shaft 1, a fork engaging with the pinion 4 in the well known manner could be used. According to this invention, a rod 20 is used, mounted in the interior of the shaft 1 which is consequently tubular, and the pinion 4 is connected to the rod 20 by means of a pin 21 held in place by a screw sleeve 22, the shaft 1 being provided with two slots 23 in which the shaft 21 can move (Fig. 4).

The arrangement shown in Fig. 2 indicates the method for obtaining two or more reduced speeds by means of a single counter-shaft, with the advantage that during the driving with one of the speeds in direct engagement, there is only one pair of change-speed gear-wheels in engagement, namely the pair 37 and 39, or 38 and 40, which improves the efficiency and reduces noise during driving. To that end, to the shaft 17 is keyed in a longitudinally adjustable manner a sleeve 36 provided with toothed rims 37 and 38 which can engage respectively with the toothed wheels 39, 40 of the drum 14.

In order to bring the pinion 37 or the pinion 38 into engagement with the corresponding toothed wheel of the drum 14, the sleeve 37 is surrounded by a fork 41 connected to the rod 42 longitudinally sliding in the brackets 43 and controlled by means of an arm 44 by a collar 45 mounted on the driving shaft 1. This collar 45 is connected by means of a screw 46 passing through the slots 47 of the driving shaft 1, to a tube 48 surrounding the rod 20 used for operating the pinion 4.

By manipulating in any suitable manner the tube 48, it is obvious that one of the wheels 37 or 38 of the counter-shaft 17 can be brought into engagement with the corresponding toothed wheel of the drum 14, independently of the device for bringing the pinion 4 into engagement with the pinion 19 of the counter-shaft 17.

The change speed gearing $a$ can be mounted in the chassis either next to the differential $b$, in which case the shaft 7 is provided at its end with a pinion 24 engaging with the bevel wheel 25 secured to the differential (Fig. 1), and the sleeve 10 is also provided with a pinion 26 engaging with the wheel 27 secured to the differential and having a greater diameter than that of the wheel 25.

When the change speed gearing $a$ is arranged immediately behind the universal joint, it is mounted on a fork $c$ which can oscillate about a horizontal axis correspondingly with the articulation of the joint (Fig. 5).

The change speed gearing is not modified by its different arrangement. Only the shaft 7 must be extended to the differential, and the sleeve 10 provided with an extension 10'. The drum 35 on which the jaws of the foot-brake act, can be secured to the parts 34 connecting together the sleeves 10 and 10'. The control of the pinion 4 is obtained in that case by means of a fork 30 engaging with a collar 30' loose on the driving shaft 1 and connected to the movable pinion 4. The fork 30 is connected by means of the rod 31 to a guide 32 (Figs. 6 and 7) with which engages the knob of the lever 33, the rotation of which is brought about by the operating lever. The guide 32 is of such shape as to enable the lever 33 to oscillate about the horizontal axis $z$—$z$ relatively to which the change speed gearing box can oscillate and which passes through the center of the universal joint, for the purpose of preventing the oscillations of the system from producing a movement of the rod 31, and consequently of the adjustable pinion 4. If, on the contrary, as shown diagrammatically in Fig. 8, the change speed gearing $a$ is mounted near the engine $d$, the shaft 7 and sleeve 10 must be provided with a universal joint 28 and 29, so as to allow the rear axle to oscillate relatively to the chassis of the vehicle about the shaft $z$—$z$.

This change speed gearing makes it possible in any case to obtain two or more speeds in direct engagement (live axle drive) and reduced speeds as well as reversing, by operating a single pinion mounted in a longitudinally adjustable manner on the driving shaft, the control of said pinion being effected, if desired, by means of a rod provided inside the shaft, and independently of the operating gear—which can also be an inner one—for obtaining one or the other of the reduced speeds.

It must be pointed out as a characteristic feature of the construction that the sleeve 10, as well as the drum 14, is mounted on the box and on the shaft 7, so as to rotate on ball bearings and without pressing on the said shaft 7.

What I claim as my invention and desire to secure by Letters Patent is:—

1. In a change speed gearing for motor cars, the combination of a driving shaft, a single driving pinion adjustable thereon, concentric driven shafts provided with inner toothed wheels capable of being engaged by said driving pinion, outer toothed wheels integral with the external driven shaft, a counter-shaft, a toothed wheel on said countershaft capable of engagement with the driving pinion, pinions on said counter-shaft capable of engaging the outer toothed wheels of the driven shaft and means for carrying said single driving pinion into engagement with the inner toothed wheels severally or with the toothed wheel of the counter-shaft.

2. In a change speed gearing for motor cars, the combination of a driving shaft, a single driving pinion adjustable thereon concentric driven shafts provided with inner toothed wheels capable of being engaged by said driving pinion, outer toothed wheels integral with the external driven shaft, a counter-shaft, a toothed wheel on said counter-shaft capable of engagement with the driving pinion, a sleeve provided with pinions adjustably mounted on said counter-shaft, means for carrying said driving pinion into engagement either with the inner toothed wheels severally or with the toothed wheel integral with the counter-shaft, and the pinions of the sleeve into engagement with one of the outer wheels of the external driven shaft.

3. In a change speed gearing for motor cars, the combination of a hollow driving shaft provided with slots, a single driving pinion adjustable on said shaft, a rod mounted in said shaft, a pin sliding in said slots and connecting the rod with the driving pinion, concentric driven shafts provided with inner toothed wheels capable of being engaged by said driving pinion, outer toothed wheels integral with the external driven shaft, a counter-shaft, a toothed wheel on said counter-shaft capable of engagement with the driving pinion, pinions mounted on said countershaft engageable with the outer toothed wheels of the external driven shaft, and means for controlling the rod connected to the driving pinion for carrying said driving pinion into engagement with the inner wheels of the driven shafts severally or with the toothed wheel of the counter-shaft.

4. In a change speed gearing for motor cars, the combination of a hollow driving shaft provided with slots, a single driving pinion adjustable on said shaft, a rod mounted in said shaft, a pin sliding in two of said slots and connecting the rod with the driving pinion, concentric driven shafts provided with inner toothed wheels capable of being engaged by said driving pinion, outer toothed wheels integral with the external driven shaft, a counter-shaft, a toothed wheel on said counter-shaft capable of engagement with the driving pinion, a sleeve adjustably mounted on said counter-shaft and provided with pinions capable of engaging the outer wheels of the external driven shaft, a fork surrounding said sleeve and connected to a collar sliding on the driving shaft, a tube in the driving shaft concentric with the rod controlling the driving pinion and pins sliding in two of the slots of the driving shaft and connecting the tube with said collar.

5. In a change speed gearing for motor cars, the combination of a driving shaft, two concentric driven shafts, ball bearings between the said driven shafts and between each driven shaft and the casing, a single driving pinion adjustable on the driving shaft, inner toothed wheels mounted on said driven shafts capable of being engaged by said driving pinion, outer toothed wheels integral with the external driven shaft, a counter-shaft, a toothed wheel on said counter-shaft capable of engagement with the driving pinion, pinions on said counter-shaft engaging with outer toothed wheels of the external driven shaft, and means for carrying said driving pinion into engagement either with the inner toothed wheels of the driven shafts or with the toothed wheel of the counter-shaft.

6. In a change speed gearing for motor cars, the combination of a driving shaft, two concentric driven shafts, ball bearings between the said driven shafts and between each driven shaft and the casing, a single driving pinion adjustable on the driving shaft, inner toothed wheels mounted integral with said driven shafts and capable of being engaged by said driving pinion, outer toothed wheels integral with the external driven shaft, a counter-shaft, a toothed wheel on said counter-shaft capable of engagement with the driving pinion, a sleeve adjustably mounted on the counter-shaft and provided with pinions capable of engaging the outer wheels of the external driven shaft, means for carrying the driving pinion into engagement either with the inner toothed wheels of the driven shafts or with the toothed wheel of the counter-shaft and one of the pinions of the sleeve on the counter-shaft into engagement with corresponding outer wheel of the external driven shaft.

In testimony whereof I have signed my name to this specification in the presence of two subscribing witnesses.

VINCENZO LANCIA.

Witnesses:
CARLO TORTO,
JOYSELYN GOUBEYRAN.